United States Patent
Bennett et al.

(10) Patent No.: US 12,131,014 B2
(45) Date of Patent: Oct. 29, 2024

(54) GRAPHICAL USER INTERFACE BUILDER FOR A HEADS-UP DISPLAY

(71) Applicant: Applied Research Associates, Inc., Albuquerque, NM (US)

(72) Inventors: Matthew Bennett, Raleigh, NC (US); Robert Karl, Raleigh, NC (US); Warren Campbell, Apex, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 17/977,940

(22) Filed: Oct. 31, 2022

(65) Prior Publication Data

US 2024/0143151 A1    May 2, 2024

(51) Int. Cl.
| | |
|---|---|
| *G06F 3/0481* | (2022.01) |
| *G02B 27/01* | (2006.01) |
| *G06F 3/04845* | (2022.01) |
| *G06F 3/04847* | (2022.01) |
| *G06F 3/14* | (2006.01) |
| *G06F 8/38* | (2018.01) |

(52) U.S. Cl.
CPC ..... *G06F 3/04847* (2013.01); *G02B 27/0149* (2013.01); *G06F 3/0481* (2013.01); *G06F 3/04845* (2013.01); *G06F 3/14* (2013.01); *G06F 8/38* (2013.01)

(58) Field of Classification Search
None
See application file for complete search history.

(56) References Cited

U.S. PATENT DOCUMENTS

| | | | |
|---|---|---|---|
| 11,055,358 B1* | 7/2021 | Guha | G06F 16/9024 |
| 2008/0168382 A1* | 7/2008 | Louch | G06F 9/451 |
| | | | 715/781 |
| 2011/0196578 A1* | 8/2011 | Strohmaier | H04N 21/41422 |
| | | | 715/810 |
| 2013/0311920 A1* | 11/2013 | Koo | G06F 3/04883 |
| | | | 715/765 |
| 2016/0246490 A1* | 8/2016 | Cabral | G06F 9/451 |
| 2018/0018783 A1* | 1/2018 | Menozzi | G06F 3/04817 |
| 2019/0079659 A1* | 3/2019 | Adenwala | H04W 4/46 |
| 2021/0058609 A1* | 2/2021 | Takahashi | G06F 3/012 |
| 2021/0286510 A1* | 9/2021 | Tyler | G06F 3/0488 |
| 2022/0261139 A1* | 8/2022 | Phoutchanthavongsa | |
| | | | G06F 9/451 |
| 2022/0415321 A1* | 12/2022 | Jung | B60K 37/02 |
| 2023/0042939 A1* | 2/2023 | Lee | G09G 5/373 |

OTHER PUBLICATIONS

"Tesla Heads Up Display Free & Simple | Android HUD" https://www.youtube.com/watch?v=wZcmKXXFyTI published on Apr. 7, 2020 (Year: 2020).*

* cited by examiner

*Primary Examiner* — Rinna Yi
(74) *Attorney, Agent, or Firm* — Erise IP, P.A.

(57) ABSTRACT

Systems, methods, and devices for a graphical user interface (GUI) builder for a heads-up display. A user may interface with the GUI builder to create a profile. The profile comprises a logical ordering of one or more screens, with each screen comprising at least one widget. The widgets may be configured to display data on the screen and may be configurable by the user. Profiles may be shared with other users. A software development kit may be provided for developing custom widgets. The heads-up display may be on a night vision device.

13 Claims, 8 Drawing Sheets

GRAPHICAL USER INTERFACE BUILDER FOR A HEADS-UP DISPLAY

STATEMENT OF GOVERNMENTAL SUPPORT

This invention was made with government support under Federal Contract No. FA8650-09-C-7909 awarded by DARPA (Defense Advanced Research Projects Agency. The government has certain rights in the invention.

RELATED APPLICATIONS

This non-provisional patent application shares certain common subject matter with U.S. patent application Ser. No. 14/132,350, filed Aug. 21, 2015, now issued as U.S. Pat. No. 9,767,374 ("the '374 patent"), and entitled "TECHNIQUES FOR ACCURATE POSE ESTIMATION"; U.S. patent application Ser. No. 15/704,934, filed Sep. 14, 2017, now issued as U.S. Pat. No. 10,304,199 ("the '199 patent"), and entitled "TECHNIQUES FOR ACCURATE POSE ESTIMATION"; U.S. patent application Ser. No. 15/704,954, filed Sep. 14, 2017, now issued as U.S. Pat. No. 10,304,200 ("the '200 patent"), and entitled "TECHNIQUES FOR ACCURATE POSE ESTIMATION"; U.S. patent Ser. No. 16/380,308, filed Apr. 10, 2019, now issued as U.S. Pat. No. 11,354,112 ("the '112 patent"), and entitled "TECHNIQUES FOR ACCURATE POSE ESTIMATION"; and U.S. patent Ser. No. 15/704,986, filed Sep. 14, 2017, now issued as U.S. Pat. No. 10,324,071 ("the '071 patent"), and entitled "TECHNIQUES FOR ACCURATE POSE ESTIMATION". The above-identified patents are hereby incorporated by reference in their entirety.

BACKGROUND

1. Field

Embodiments of the present disclosure relate to heads-up displays (HUDs). More specifically, embodiments of the present disclosure relate to graphical user interface (GUI) builders for creating configurable heads-up displays.

2. Related Art

Field personnel utilize HUDs during operations to view relevant operational parameters. For example, location information and objective information may be displayed on the HUD. The HUD may be an augmented reality (AR) display that is arranged in the line of sight of a user to show data in the context of the user's environment. Often, a computing device, such as a smartphone, for viewing additional information is attached to the user's body. However, during night operations, the use of the computing device's screen breaks light discipline, which in turn leads to increased chances of detection and can be dangerous for field personnel.

User interfaces for HUDs are usually preset by the manufacturer and immutable once shipped. If data important for a mission is not displayed as part of the preconfigured HUD GUI, a user has no way to add it to the GUI. Further, individual customers and/or users may have unique layout requirements that are not provided by the manufacturer. Further still, while customers may request custom GUIs from a manufacturer, if the customer's needs later change, the customer is still unable to modify the GUI. As such, what is needed are HUD GUIs for maintaining light discipline, with user-configurable layouts and displays.

SUMMARY

Embodiments of the present disclosure solve the above-described problems by providing systems, devices, and methods for building custom GUIs for rendering on a HUD. Via a GUI builder, users may create custom profiles comprising a plurality of screens for displaying information on a HUD. A screen may comprise a plurality of widgets, with each widget configured to display data on the HUD. The data may originate from one or more sensors or other data sources. The HUD may be part of an augmented reality system on a night vision device that is worn by military personnel.

In some aspects, the techniques described herein relate to one or more non-transitory computer-readable media storing computer-executable instructions that, when executed by at least one processor, perform a method of building a graphical user interface for a heads-up display, the method including: causing display of a graphical user interface builder for the heads-up display; receiving, from a user and in the graphical user interface builder, a first user input for adding a screen to a profile associated with the user; receiving a second user input for adding one or more widgets to the screen, wherein the one or more widgets are associated with one or more data sources, wherein the one or more widgets are configured to display data from the one or more data sources on the heads-up display; receiving user configuration of at least one of a size or a location of the one or more widgets on the screen; uploading the profile to the heads-up display; and causing display of the screen on the heads-up display.

In some aspects, the techniques described herein relate to a media, wherein the graphical user interface builder is configured to run on a mobile phone.

In some aspects, the techniques described herein relate to a media, further including: receiving a third user input for adding an additional screen for the profile; and receiving a fourth user input for adding one or more additional widgets to the additional screen to obtain an updated profile.

In some aspects, the techniques described herein relate to a media, further including: uploading the updated profile to the heads-up display; and responsive to receiving user input while the screen is displayed, causing display of the additional screen on the heads-up display.

In some aspects, the techniques described herein relate to a media, further including uploading the profile to an additional heads-up display.

In some aspects, the techniques described herein relate to a media, further including: after causing display of the screen on the heads-up display, receiving at least one modification to at least one of the screen or the one or more widgets to obtain a modified screen; responsive to receiving the at least one modification, uploading the modified screen to the heads-up display; and causing display of the modified screen on the heads-up display.

In some aspects, the techniques described herein relate to a media, wherein the heads-up display is on a night vision display device.

In some aspects, the techniques described herein relate to a media, wherein the one or more widgets includes at least a location widget configured to display a location of the user.

In some aspects, the techniques described herein relate to a system for building a graphical user interface for a heads-up display, the system including: a night vision device including the heads-up display positioned in a line of sight of a user; at least one processor; and one or more non-transitory computer-readable media storing computer-executable instructions that, when executed by the at least one processor, cause the system to carry out actions including: receiving, in a graphical user interface builder for the heads-up display, a first user input for addition of a screen to a profile; receiving a second user input for addition of one or more widgets to the screen, wherein the one or more widgets are configured to display data on the heads-up display; receiving a third user input for selecting one or more data sources for the one or more widgets; uploading the profile to the heads-up display; and causing display of the screen on the heads-up display.

In some aspects, the techniques described herein relate to a system, further including: a battery pack for powering the heads-up display, wherein the battery pack houses the at least one processor; and at least one input element on the battery pack for interacting with the screen on the heads-up display.

In some aspects, the techniques described herein relate to a system, wherein the battery pack is configured to be mounted to a helmet or to the user.

In some aspects, the techniques described herein relate to a system, wherein the one or more widgets includes a widget configured to display a battery level of the battery pack.

In some aspects, the techniques described herein relate to a system, further including: at least one sensor associated with the heads-up display, wherein the one or more data sources includes the at least one sensor.

In some aspects, the techniques described herein relate to a system, wherein the one or more widgets includes a video player widget, and wherein the one or more data sources includes a video sensor, and wherein the video player widget is configured to display video data from the video sensor.

In some aspects, the techniques described herein relate to a system, wherein the heads-up display is on a vehicle.

In some aspects, the techniques described herein relate to a method for building a graphical user interface for a heads-up display, the method including: receiving, from a user and in a graphical user interface builder for the heads-up display, a first user input for addition of a plurality of screens to a profile associated with the user; receiving a second user input for addition of one or more widgets to each of the plurality of screens; receiving a third user input for configuring one or more parameters for the one or more widgets; uploading the profile to the heads-up display; and causing display of a screen of the plurality of screens on the heads-up display, wherein the one or more widgets are configured to display data based on the one or more parameters.

In some aspects, the techniques described herein relate to a method, wherein the heads-up display includes at least one input element for interacting with the screen on the heads-up display.

In some aspects, the techniques described herein relate to a method, further including: responsive to receiving an actuation of the at least one input element, causing display of a different screen of the plurality of screens on the heads-up display.

In some aspects, the techniques described herein relate to a method, wherein the one or more widgets are configured to receive focus on the heads-up display, and where the method further includes: responsive to receiving a first actuation of the at least one input element while the screen is displayed on the heads-up display, moving focus between the one or more widgets on the screen.

In some aspects, the techniques described herein relate to a method, wherein the method further includes: responsive to receiving a second actuation of the at least one input element while a widget of the one or more widgets is focused, initiating a predefined action associated with the widget.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE FIGURES

Embodiments of the present disclosure are described in detail below with reference to the attached drawing figures, wherein.

Figure 1:
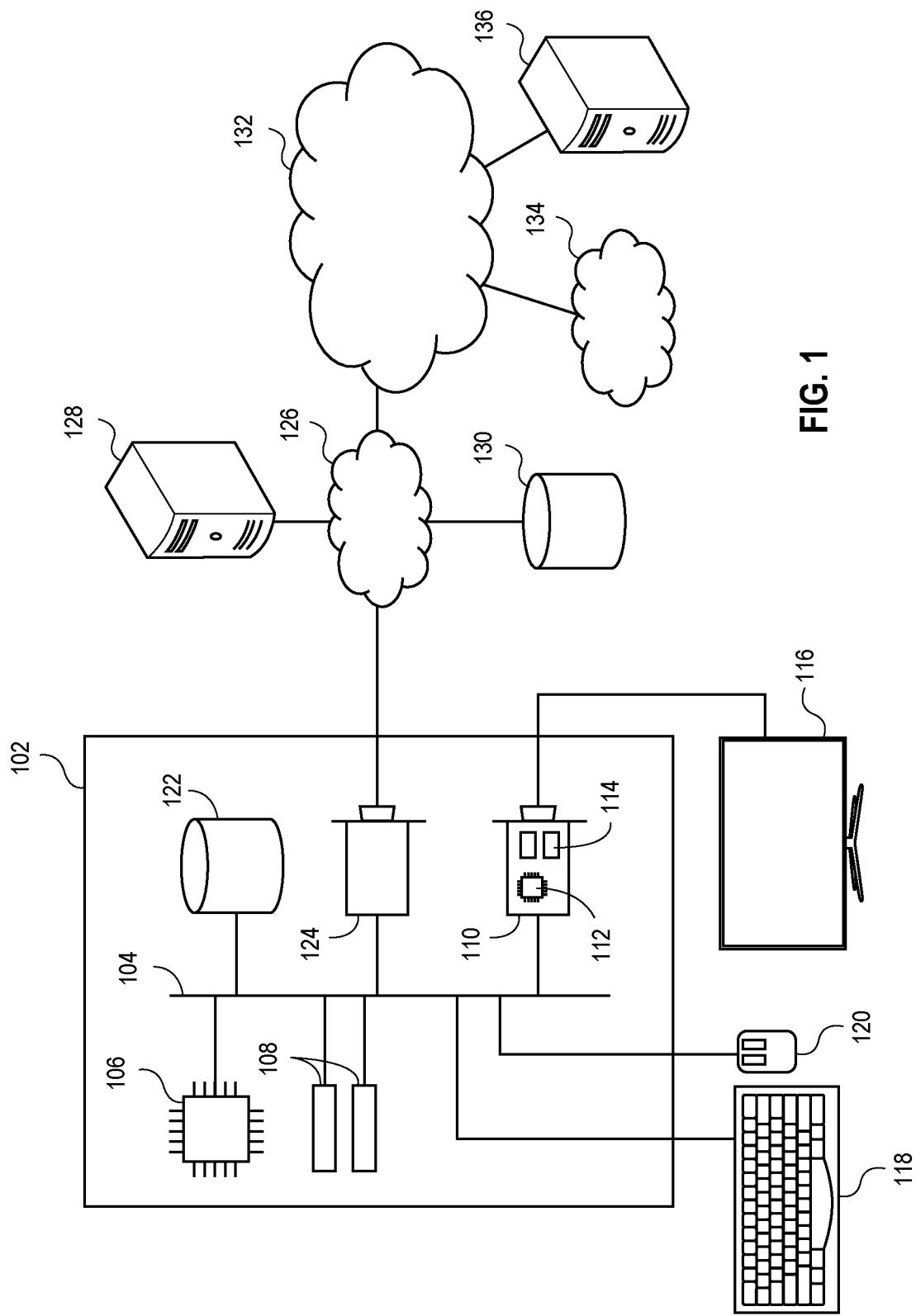
FIG. 1 depicts an exemplary hardware platform relating to some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments described herein are generally directed to systems, devices, and methods for creating custom graphical user interfaces (GUIs) for heads-up displays (HUDs) with a GUI builder. A display device, such as a night vision monocular, may be configured with a display positioned in a line of sight of the user. In some embodiments, the display is a see-through display such that the user can see the information on the display and the surrounding environment through the display. In various embodiments, the display may be an optical see-through display or a digital see-through display. A GUI builder may be provided for creating profiles. A profile may include one or more screens. Each screen may include one or more widgets that are configured to write data to the GUI for display on the HUD. For example, a location widget may be configured to write received GPS data to the GUI such that the user can view their current location on the HUD. In operation, the user may toggle between the plurality of screens to view different widgets located on different screens in the profile.

In some embodiments, the systems, methods, and devices described herein are configured to be used in night operations or other light-deficient operations. Thus, in some embodiments, the widgets and screens described herein are configured to display information in a manner that maintains light discipline. It is one advantage of the present disclosure that, by providing a GUI builder for creating custom GUIs for HUDs that may be used prior to conducting an operation, a user does not have to access an external computing device during the operation, which may break light discipline. Embodiments of the present disclosure may also be used for daytime operations.

Turning to FIG. 1, an exemplary hardware platform for certain embodiments is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently and may be non-transitory computer-readable media storing data or computer-executable instructions. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 102.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

System Overview

Figure 2:
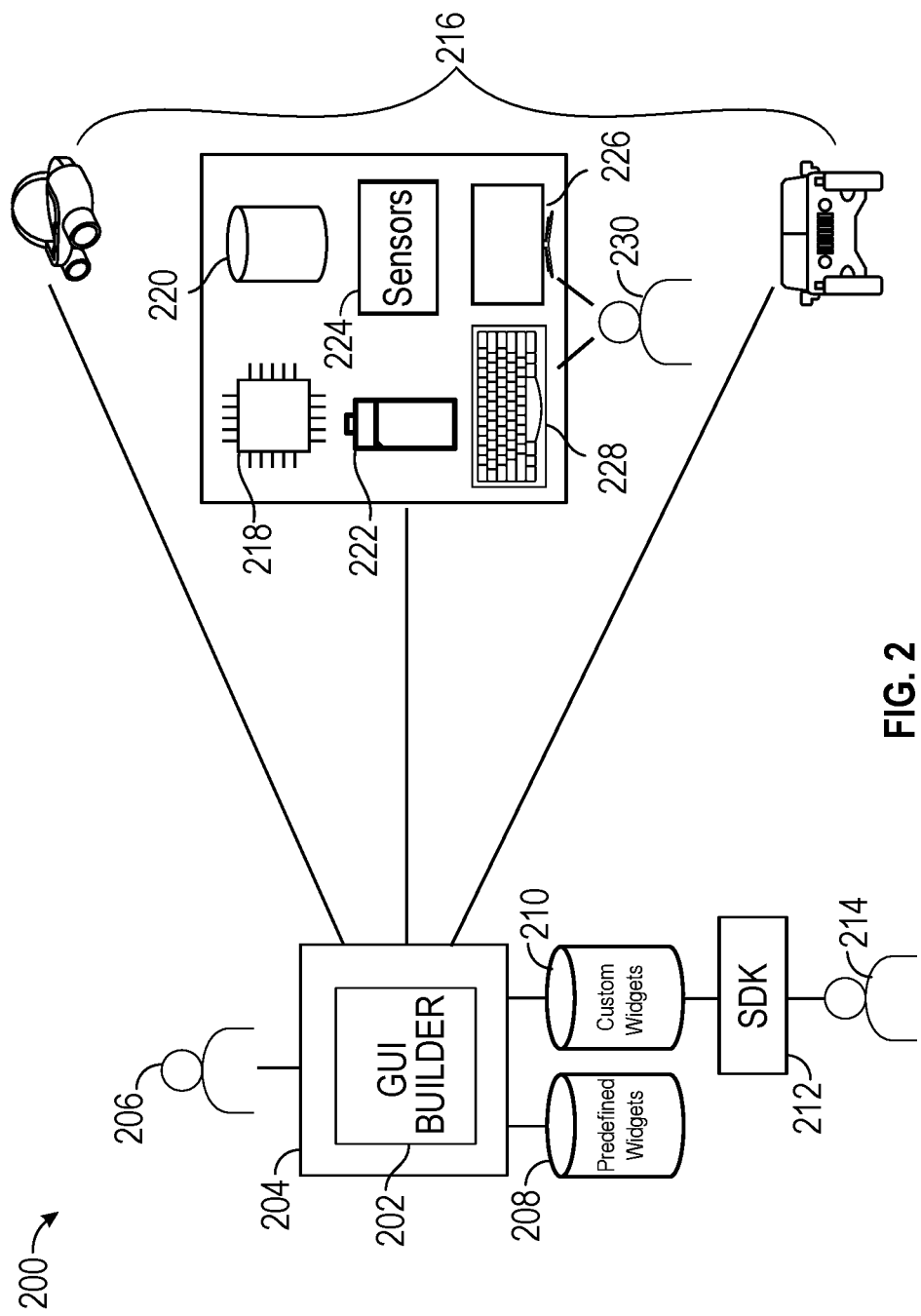
FIG. 2 illustrates a block diagram for some embodiments.

FIG. 2 illustrates a block diagram of a system 200 in accordance with embodiments of the present disclosure. In some embodiments, system 200 comprises a GUI builder 202 for creating customized user interfaces. GUI builder 202 may be a software application running on hardware 204, such as any of the hardware described above in FIG. 1. For example, GUI builder 202 may run on a desktop computer, a tablet, or a laptop. In some embodiments, hardware 204 is a mobile phone, such as a smartphone. It is one advantage of the present disclosure that, by providing GUI builder 202 on a smartphone, users can create and modify custom GUIs on-the-fly without requiring access to a more powerful computing system. For example, a military operative may configure a custom GUI in advance of an operation that the operative is preparing to carry out via the operative's smartphone. A user 206 may interface with GUI builder 202 to create and modify GUIs for display on a heads-up display device. Exemplary user interfaces for GUI builder 202 are discussed below with respect to FIGS. 3A-3C.

As discussed in further detail below, user 206 may create a user profile. The user profile may comprise one or more screens that are displayed on the HUD, and each of the one or more screens may comprise one or more widgets. In some embodiments, the widgets are user interface elements that display data on the HUD based on various parameters set by the user, as discussed further below. For example, a widget may be configured to display data indicative of a battery level for the HUD.

Widgets for GUI builder 202 may be predefined widgets 208 or custom widgets 210. Predefined widgets 208 comprise widgets that have been preconfigured by the original equipment manufacturer. In some embodiments, system 200 comprises a software development kit (SDK) 212 via which a developer 214 may program custom widgets 210 that can be added to a screen in the profile. For example, developer 214 may develop a custom widget that is configured to display data relevant to an operation, or a hardware manufacturer may develop a custom sensor that is not otherwise supported. Because the operation or sensor may be unique, it is unlikely that an OEM will have a preconfigured widget 210 that is appropriate. Therefore, by providing an SDK 212 via which developers 214 can program their own widgets, the systems and methods described herein provide an improvement in the customization of GUIs for HUDs.

Once user 206 configures the screens and widgets in the profile, the GUI may be uploaded to a HUD 216. In some embodiments, more than on profile can be stored and accessible on the HUD 216. In some embodiments, HUD 216 is configured as a night vision device, such as a monocular. In some embodiments, HUD 216 is configured as a vehicle, such as a Humvee, or other land, sea, space, or air vehicle. HUD 216 may comprise or otherwise be associated with processor 218, storage 220, power source 222, one or more sensors 224, display 226, one or more inputs 228, or any combination thereof. An operator 230 operating HUD 216 may interact therewith via display 226 and input 228.

In some embodiments, processor 218 (which may be a plurality of processors) is configured to render the GUI for display on display 226 based in part on data retrieved from storage 220 and/or sensors 224. Processor 218 may be connected to HUD 216 via a wired connection, and data may be transferred between processor 218 and HUD 216 via a high-speed serial transmission protocol. In some embodiments, processor 218 is located within a housing that houses power source 222. In some embodiments, the processor 218 may run from a mobile device or other remote computing device and wirelessly transmit data to the HUD 216. For example, processor 218 may be the processor for the hardware 204 running GUI builder 202 and be connected to HUD 216 via a BLUETOOTH connection.

In some embodiments, storage 220 stores data that is accessible by processor 218 for writing for display on HUD 216. For example, image and/or map data may be stored in storage 220 and written for display by processor 218. In some embodiments, storage 220 is remote storage, such as a cloud-based storage. In some embodiments, system 200 comprises local storage and is coupled to an external storage from which data can be retrieved. In some embodiments, user 206 can upload data to storage 220 via GUI builder 202. In some embodiments, data from sensors 224 is stored in storage 220.

HUD 216 may be powered by a power source 222. In some embodiments, HUD 216 is powered by a battery; however, any power source may be used. For example, power source 222 may be a car battery when HUD 216 is on a vehicle. In some embodiments, the power source 222 is mounted to a rigid reference assembly, such as a helmet worn by operator 230. In some embodiments, power source 222 is mounted to operator 230, such as to a tactical vest or other clothing worn by operator 230.

In some embodiments, sensors 224 comprise a 3-axis accelerometer, a 3-axis angular-rate gyroscope, a 3-axis magnetometer, a barometric pressure sensor, a GPS receiver, and a camera. As discussed in detail in the '374 patent, the '199 patent, the '200 patent, the '112 patent, and the '071 patent, the accelerometer, gyroscope, magnetometer, barometric pressure sensor, GPS receiver, and camera may be mounted to the rigid reference assembly (e.g., a helmet worn by operator 230), and data measured by the sensors 224 may be used to determine an estimate of the user's pose, and the pose may be continually estimated as the user moves while operating HUD 216. In some embodiments, processor 218 is configured to perform the pose estimation for operator 230. In some embodiments, pose estimation is performed by a separate processor (not shown) associated with HUD 216, and processor 218 is only configured to render the GUI for display on the HUD 216.

Many additional sensors may be used alone, or in combination, with the aforementioned sensors. Other exemplary sensors include, but are not limited to, thermal sensors, IR sensors, CBRN sensors, electronic warfare sensors, acoustic sensors, optical sensors, video sensors, and biometric sensors. One or more of sensors 224 may be remote from HUD 216 and in wireless communication with HUD 216. For example, a remote video sensor may stream video data to HUD 216. The sensors 224 may be associated with a widget such that the widget is configured to display data from the sensors.

HUD 216 may also comprise display 226 on which the GUI may be rendered. In some embodiments, display 226 is a helmet-mounted display or other head-mounted display configured to be worn by operator 230. In some embodiments, display 226 is a see-through display, such as on a night vision device. In some embodiments, display 226 is a display in a vehicle, such as on the windshield of a vehicle. In embodiments where HUD 216 is on a vehicle, processor 218 may be part of a computing system of the vehicle. Display 226 may display the user-configured screen. In some embodiments, display 226 displays a single screen from the profile at a time.

In some embodiments, operator 230 can interact with the HUD 216 via inputs 228 and/or display 226. Inputs 228 may be a physical input (e.g., a button) that may be disposed proximal to HUD 216, such as on a battery pack housing power source 222. In some embodiments, sensors 224 comprise one or more sensors configured to detect input 228 from operator 230. For example, in some embodiments, operator 230 may provide input to HUD 216 via voice commands, gaze input, gestures, or any combination thereof. Operator 230 may use input 228 to interact with display 226, such as to view a different screen in the profile or to change widget focus, as discussed further below.

GUI Builder

Figure 3A:
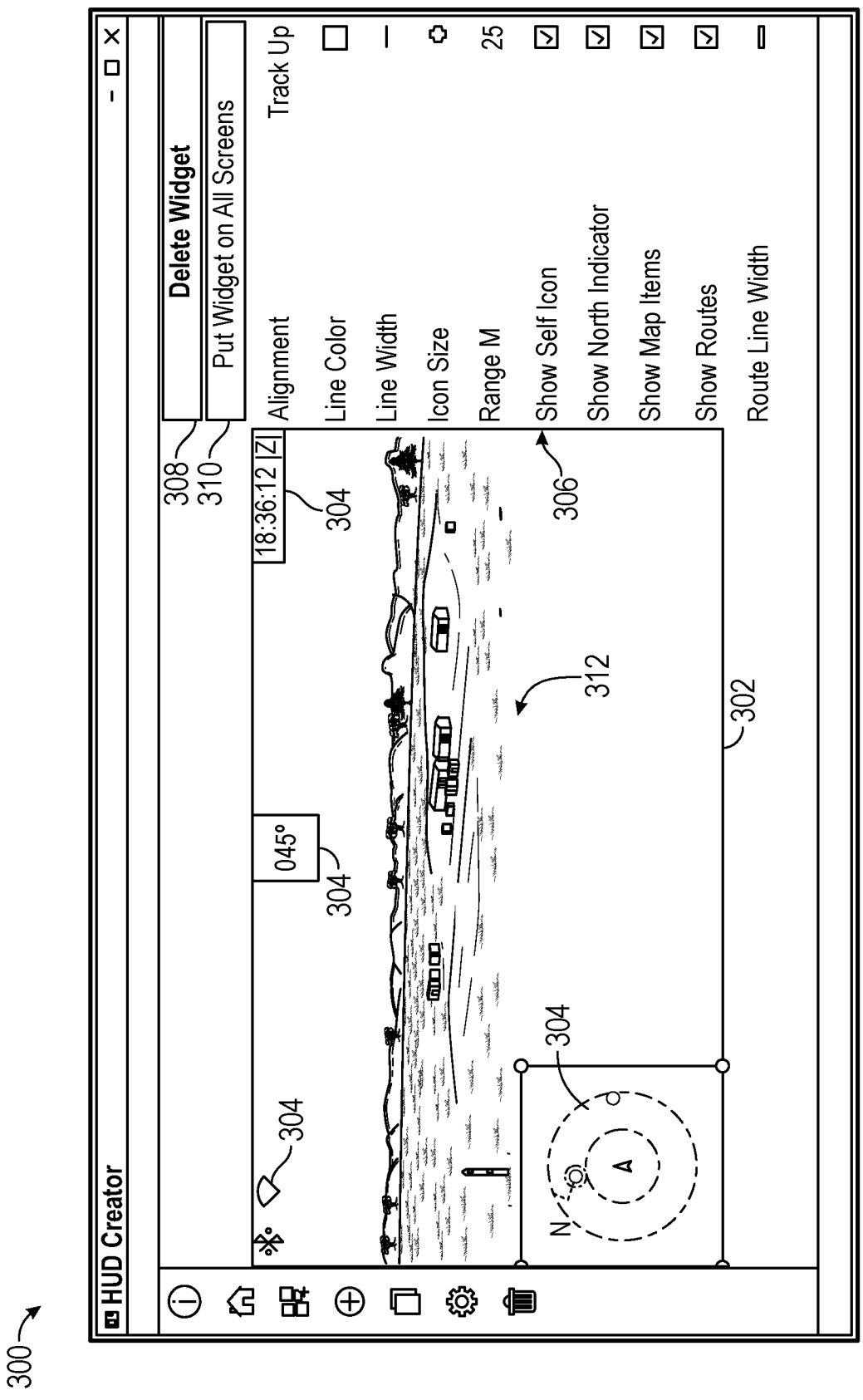
FIG. 3A illustrates a first user interface for a GUI builder for creating a graphical user interface for some embodiments.
Figure 3B:
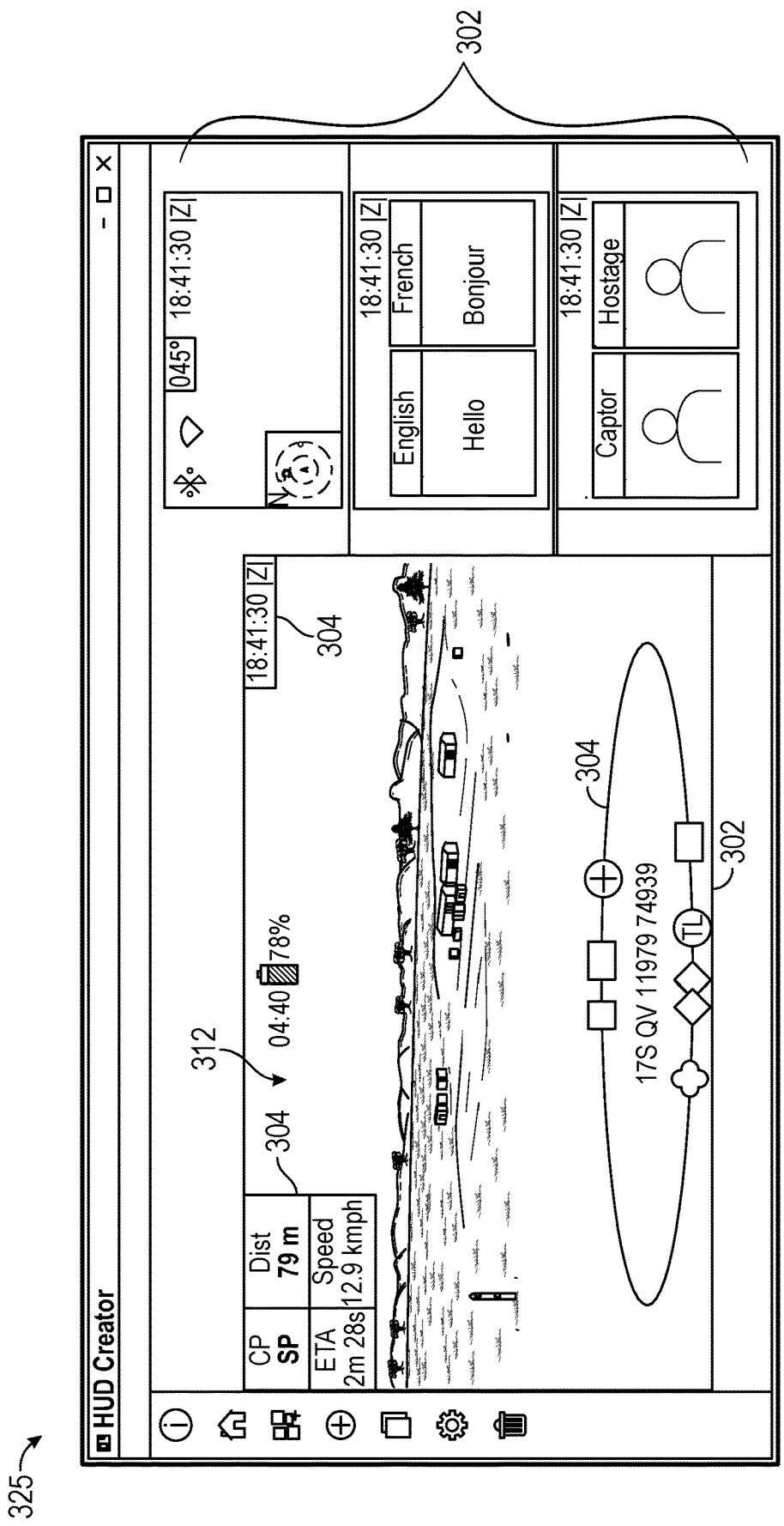
FIG. 3B illustrates a second user interface for the GUI builder for some embodiments.
Figure 3C:
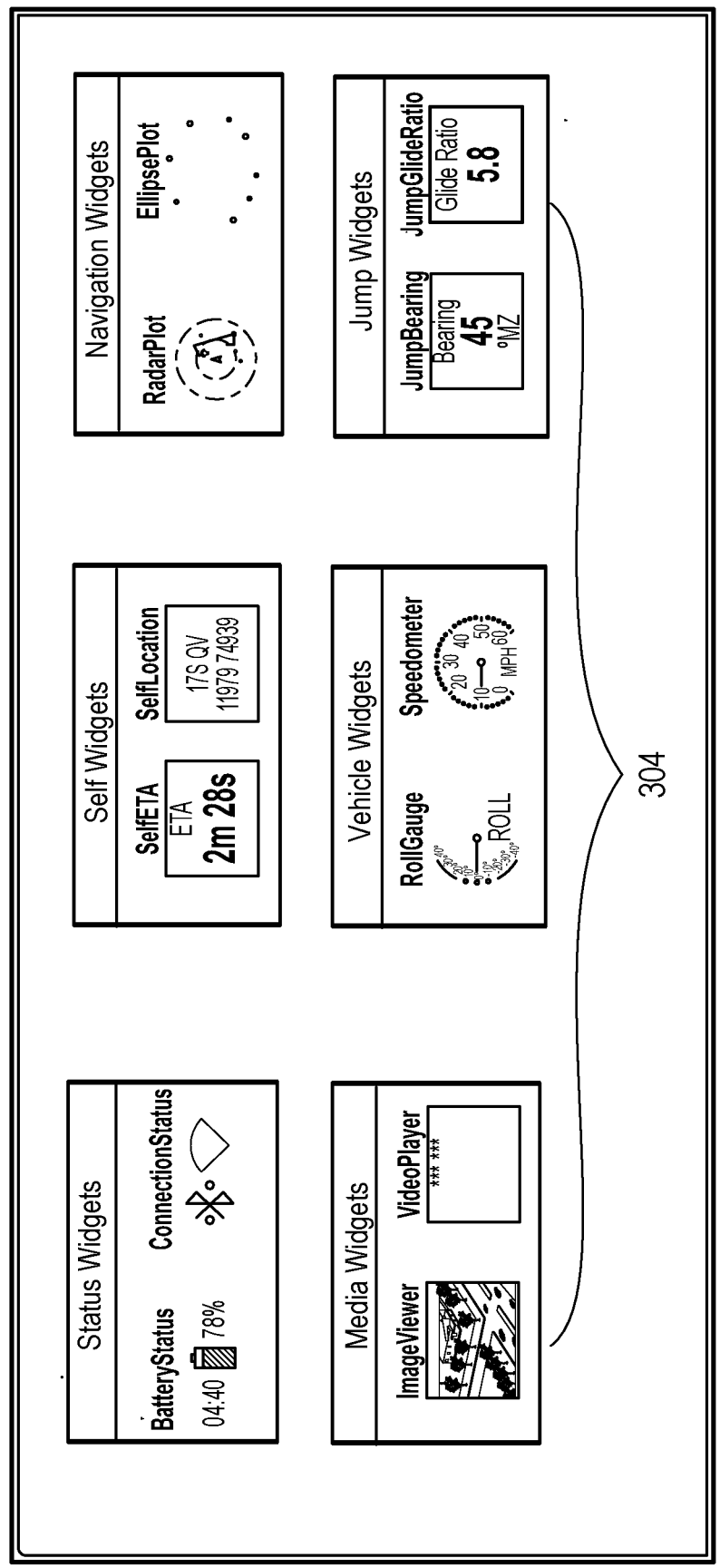
FIG. 3C illustrates exemplary widgets in accordance with embodiments of the present disclosure.

FIGS. 3A, 3B and 3C illustrate a user interface 300 and a user interface 325, respectively, of GUI builder 202 for creating custom GUIs that are rendered on HUD 216 for some embodiments. User interface 300 depicts an exemplary interface for creating a screen 302. As described above, user 206 may interface with GUI builder 202 to create a profile that comprises one or more screens 302. A user 206 may be create the profile, which is a logical, ordered collection of the one or more screens 302. Each screen 302 may comprise one or more widgets 304 that are programmed to write data rendered in the GUI on display 226, such as data from any of the sensors 224 described herein. Once user 206 creates the profile, the profile may be shared with other users directly and/or the profile can be published to a collection or repository of profiles for use by other users. Profiles that are obtained from another user may be further customized by the obtaining user via GUI builder 202. In some embodiments, user 206 may have multiple profiles. In some embodiments, user 206 can define a name for screens 302 and profiles in GUI builder 202.

In some embodiments, profiles may be created for different missions/objectives, and each screen 302 in a profile may be configured by user 206 to display data relevant to a portion of the mission. For example, user 206 may create a first screen 302 comprising a first plurality of widgets 304 useful for an ingress portion of a mission and a second screen comprising a second plurality of widgets 304 useful for an egress portion of the mission. Alternatively, or additionally, profiles, rather than screens 302, may be configured for a specific use case (e.g., ingress/egress, hostage rescue, fire rescue, disaster response, etc.).

As shown, screen 302 in FIG. 3A comprises a connection status widget 304, a heading widget 304, a clock widget 304, and a radar plot widget 304. Widgets 304 are user interface elements that display specific data on HUD 216 at a user-configurable position and in a user-specified format. The data may be data stored in storage 220, data measured from sensors 224, or any other data. For example, data for the heading widget may be determined from sensors 224, while data for an image widget (see FIG. 3B) may be retrieved from storage 220. As discussed above, widgets 304 may be predefined widgets 208 or custom widgets 210 developed by a developer 214.

When creating screens 302, user 206 may arrange each widget 304 on screen 302 at a user-specified position. In some embodiments, drag-and-drop or other input methods are provided for user 206 to modify the position of widgets 304. As shown, the radar plot widget 304 is the currently selected widget and is bounded with an edit box by which user 206 may modify the size of the radar plot and/or move the radar plot widget to a different position on screen. In some embodiments, when adding a widget 304 to screen 302, user 206 may specify a position and/or a widget size, such as via a dialog box for inputting coordinate positions of the widget and height and width information, and the widget is displayed on screen 302 based on the inputted parameters. In some embodiments, widgets 304 are automatically added to a default position on screen 302 based on a type of the widget. For example, widgets 304 that display hardware information may be automatically positioned near a top of screen 302, while navigational widgets 304 may be automatically positioned near a center of screen 302.

Various other modifications may be input to customize the display of widgets 304. In some embodiments, user interface 300 comprises widget options 306, which may comprise one or more configurable parameters for modifying the display of a widget 304. Selecting a different widget 304 in screen 302 (or adding a new widget 304 to screen 302) may display a different set of options for that widget 304 in widget options 306. In some embodiments, display color, text font, line thickness, icon size and the like may be modifiable via widget options 306. In some embodiments, a widget 304 comprises multiple user interface components that are individually configurable. For example, the radar plot widget comprises an icon, lines, a North indicator, and map items, each of which may be individually modifiable by user 206. As another example, the clock widget may have configurable display parameters relating to the format that the time is displayed (e.g., 12 hour, 24 hour, or a clock icon). In some embodiments, display changes applied to a widget 304 are applied to each user interface component that is a part of the widget 304. One of skill in the art will appreciate that various widgets may have various configurable options for customizing the display thereof for the user 206. Modifying display options for widgets 304 may be useful when operator 230 is operating at night, as it may be difficult to see widgets 304 that are darker in color at night. As such, user 206 may configure the color of widgets 304 to ensure that operator 230 can easily read the data displayed by widgets 304.

In some embodiments, the format of the widget 304 may also be customized by user 206 by modifying which data the widget 304 is configured to display. For example, user 206 may add two radar plot widgets 304 to a screen 302, one of which may display radar-like data based on the current position of operator 230 and the other of which may display radar data related to another person, such as another operative that operator 230 is working with on an operation. When adding the two radar plot widgets 304 to screen 302, user 206 may indicate which individual's position data should be displayed on each of the widgets. As another example, operator 230 may be leading an operation with other operatives. Each operative may be wearing a body-camera for recording video data. A video player widget 304 may be added to a screen 302 for displaying the body-camera video, and user 206, via GUI builder 202, may select which of the body cameras to stream for display in the video player widget. Further, to have each operative's video available to operator 230, user 206 may create multiple screens 302 corresponding to each operative and add a video player widget to each screen 302 such that each operative's video is accessible in the profile. Alternatively, or in addition, a single widget may display video from an operator-selected body camera based on input from an operator during use, as discussed further below.

Widget options 306 may also comprise a delete control 308 and an add to all screens control 310. Delete control 308 may be actuated to delete the selected widget 304 from the screen 302. In some embodiments, delete control 308 is configured to delete the selected widget 304 from all screens 302 in the profile. For example, looking at FIG. 3B, a clock widget is displayed on each of the four screens 302 in the profile. Actuation of delete control 308 for the clock widget in one of the four screens 302 may cause deletion of the clock widget across all screens 302 in the profile. In some embodiments, a pop-up or dialog box is displayed to receive user confirmation of whether to delete the selected widget 304 across all screens 302 in the profile.

Add to all screens control 310 may add the selected widget 304 to all screens 302 in the profile. The widget 304 may be added in the same location on all screens 302 based on the location of the widget 304 when add to all screens control 310 is selected. In some embodiments, if a new screen 302 is created after adding a widget 304 to all pre-existing screens 302 with add to all screens control 310, the widget 304 is automatically added to the new screen 302. In some embodiments, multiple widgets 304 can be selected simultaneously (e.g., through a click-and-drag input) such that multiple widgets 304 may be added or deleted from one or more screens 302 simultaneously using delete control 308 and add to all screens control 310.

In some embodiments, a background 312 may be added to screen 302. As depicted in FIG. 3A, background 312 shows buildings and a field. Background 312 may be used as a preview such that background 312 is not shown as part of screen 302 when used in operation. In some embodiments, background 312 may also be configured as a synthetic environment. For example, satellite imagery of an operational site may be used to construct background 312 and depict buildings based on the satellite imagery. The buildings and other objects in the environment may be depicted translucently or transparently. Background 312 may then be an accurate representation of the location that operator 230 will be working in. Such an embodiment may be useful when operator 230 is operating an a region about which minimal information is know. Backgrounds 312 may be configured on a per-screen basis or a per-profile basis. The background 312 may be customizable such that user 206 can view the layout of screen 302 in a similar manner to how widgets 304 will look in operation when operator 230 is using the HUD 216. For example, a simulated night vision background may be applied such that user 206 can visualize how widgets 304 may look during night operations when using a night vision device. In some embodiments, an augmented reality preview may be added as background 312. For example, when creating a profile comprising screens 302 configured for use with a land vehicle, it may be useful to add a terrain mesh background illustrative of the terrain that vehicle is intended to drive on. In some embodiments, an augmented reality road background may be added as background 312. One of skill in the art will appreciate that various other AR imagery may be added to display information in background 312. Like widgets 304, backgrounds 312 may have various configurable display options. For example, for a terrain map background 312, display options may be provided for showing elevation (e.g., a color gradient elevation map), thresh options, spacing, contour, color depth, fade depth, grid line options, and the like.

Looking now at FIG. 3B, a user interface 325 displaying an overview of multiple screens 302 making up a profile is depicted for some embodiments. User interface 325 may be used to view all screens 302 in the profile, to add or delete screens 302, and to select a screen 302 to edit. A currently-selected screen 302 may take up a majority of the display space in user interface 325. The ordering of screens 302 in user interface 325 may correspond to the order in which the screens 302 will be displayed on display 226 in operation. The display order of screens 302 may be modified via drag and drop or other like methods in GUI builder 202. In some embodiments, a screen 302 can be set as a home or a default screen that is automatically displayed when the HUD 216 is powered on. In some embodiments, user interface 325 is scrollable to view additional screens in the profile. In some embodiments, the currently-selected screen 302 may be editable via a double tap or other actuation to bring up user interface 300 for customizing the screen 302.

FIG. 3C illustrates a widgets palette 350 displaying a plurality of exemplary widgets 304 for some embodiments. In some embodiments, user 206 can actuate a user interface control on user interface 300 to display widgets palette 350 in GUI builder 202. Each widget 304 that is accessible to user 206 in GUI builder 202 may be provided in widgets palette 350. As described above, SDK 212 may be provided for user 206 to programmatically develop custom widgets 210 that may be added widgets palette 350.

Widgets palette 350 may be a scrollable list or comprise a plurality of pages or the like for viewing widgets 304 that do not fit on the user's display. As shown, in some embodiments, widgets 304 are sorted into categories, such as a category for status widgets and a category for vehicle navigation widgets. In some embodiments, widgets 304 are categorized based on a sensor and/or sensor-type (e.g., location sensor, electronic warfare sensor, etc.) that the widget 304 is configured to interface with. The categories may be user-defined or determined by a machine learning model or other learning system, for example. Some widgets 304 may be a part of more than one category. When user 206 selects a widget 304 from widgets palette 350, widgets palette 350 may be closed or otherwise hidden from view in GUI builder 202, and the widget 304 may be added to screen 302 in user interface 300. In some embodiments, the widget 304 is added to an arbitrary spot in screen 302 where no other widgets 304 are docked. Thereafter, user 206 may customize the widget 304 on screen 302 as discussed above.

Various exemplary widgets 304 will now be described. It will be appreciated that the following list of widgets is exemplary, and many other widgets may be used without departing from the scope hereof.

In some embodiments, widgets 304 are configured to display information relating to status parameters of HUD 216. As described above, a connection status widget may be provided indicating connection information for the hardware. As another example, a battery widget may indicate a battery level of the battery pack. The battery widget may display one or more of: a remaining battery life (e.g., two hours remaining), a percent battery remaining, or a battery icon visually indicating a remaining battery life of the battery pack. In some embodiments, the text or icon color for the battery widget changes based on the battery life. For example, the color may be green for battery levels above 50%, orange for battery levels between 25% and 50%, and red for low battery levels below 25%. In some embodiments, a GPS status widget is provided. The GPS status may indicate connection status for connection to a GPS sensor 224. The GPS sensor may also interface with a map widget, for example, to display the real time location of operator 230 on the HUD 216.

Self widgets 304 related to the operator of HUD 216 may be provided. The self widgets may relate to status objectives for a current mission or objective associated with the operator 230. For example, a widget may display checkpoint information including, but not limited to, a distance to the checkpoint, an estimated time of arrival (ETA) to the checkpoint, a current and/or average speed displaying the user's rate of travel. Other self widgets may include an elevation widget for indicating the current elevation of the user and a heading widget for indicating the user's heading.

In some embodiments, media-related widgets 304 are provided. In some embodiments, user 206 can load images into an image gallery (e.g., which may be stored in storage 220) and the image gallery can be added to screen 302 as a widget 304. For example, if user 206 is operating in a hostage rescue mission, an image gallery widget may be used to display an image of the hostage and an image of a target that is holding the hostage, as shown in FIG. 3B. Alternatively, or additionally, the image gallery widget may be configured to display images that are retrieved in real time from an external data source. When an image gallery widget is used, operator 230 may actuate an input 228 to cycle through each of the images in the gallery. As another example, a text-based widget 304 may be provided to display textual information. For example, if the hostage speaks French, a list of common phrases in French may be displayed for communicating with the hostage.

Similarly, a video player widget may be provided. The video player may display a still frame from the video in a preview mode, and when actuated (e.g., via input 228), the video may play on HUD 216. In some embodiments, the video is part of a video gallery such that multiple videos are associated with a single video widget. In some such embodiments, videos play automatically. Audio data for the video may be transmitted (e.g., via wired or wireless means) to an audio output device associated with operator 230. In some embodiments, the video player widget is configured to stream live video data from an external video source. For example, the operator 230 may be working with a second operator on a mission. A body-camera worn by the second operator may be streamed for display on the HUD 216 of the operator 230. Thus, the operator 230 can be provided with a real-time stream of the second operator's point of view. As discussed above, it is one advantage of the present invention that, by allowing users to build custom screens 302 which can be switched between on-the-fly, operator 230 can rapidly switch between the video stream (which may take up a majority of the display space on display 226 and be distracting for operator 230 while performing other tasks) and a more minimal display of data on a separate screen 302. As another example, it is contemplated that video from a drone may be streamed to processor 218 for display on display 226. Broadly, any video source may transmit data to the processor 218 for display on display 226.

Navigation widgets may also be provided for aiding operator 230 in navigation. For example, a map widget may be provided to display map data. The map may be any type of map, such as a topographic map or a road map. Additionally, GPS data for other personnel associated with operator 230, such as other operatives, may be displayed on the HUD 216 via the map widget. In some embodiments, users can add checkpoints to locations in the environment, and a route to the location is determined and overlaid on the map widget.

Other exemplary navigation widgets include radar plots and ellipse plots. As discussed in further detail in the '374 patent, the '199 patent, the '200 patent, the '112 patent, and the '071 patent, in a military application, the ellipse plots (also referred to as a situational awareness ring) provides a real-time 360° understanding of where friendlies, enemies, and other points of interest are located. At the center of the grid is a Military Grid reference coordinate and located above the ring is the heading. Icons may move around situational awareness ring in response to user rotation. Geo-registered icons and those on situational awareness ring may be displayed with range information from the user.

In some embodiments, widgets 304 are specific to a travel method, such as vehicle navigation, air/spacecraft navigation, sea vehicle navigation, jumping (e.g., HALO or HAHO jumps), or the like. Various jump-related widgets 304 may be added to screen 302 such that a parachutist can view real-time information during the descent. In some embodiments, a jump altitude widget indicating a current altitude of is provided. In some embodiments, a jump bearing widget displaying a current bearing of is provided. Likewise, a jump heading widget displaying a current heading and/or a jump planned heading indicating a preset heading direction is provided. In some embodiments, a jump ETA widget indicating the ETA to the destination is provided. In some embodiments, a jump range widget indicates the current jump range. Other jump-related widgets, such as a current jump-glide ratio and a jump-glide ratio to the destination may also be provided. The current jump-glide ratio indicates the ratio of forward travel to altitude descent, and the jump-glide ratio to the destination indicates the needed glide ratio to reach the target destination. In some embodiments, widgets 304 may indicate the range of the jump and the current and/or average speed of operator 230. Each of the above-described widgets 304 may be configured to display data from the appropriate sensors (e.g., accelerometers, location sensors, etc.) to display the jump-related information as will be apparent to one of skill in the art.

Various widgets 304 providing vehicular information may be provided. As described above, HUD 216 may be used in conjunction with a vehicle, and custom screens 302 may be configured by user 206 to display relevant information on HUD 216. In some such embodiments, HUD 216 may be on a windshield of the vehicle, thereby providing a transparent surface on which widgets 304 can be displayed without impairing the vision of the driver. In some embodiments, widgets 304 can be displayed on an infotainment center or other display within the vehicle.

In some embodiments, a blind spot widget is provided which may provide live camera feeds of one or more blind spots of the vehicle. In some embodiments, a gear widget indicates the gear the vehicle is currently operating in (e.g., park, drive, reverse, etc.). In some embodiments, a lane assist widget provides visual and/or auditory indications when it is detected that the vehicle is drifting out of its lane. In some embodiments, a roll gauge widget is provided to indicate a roll of the vehicle. As another example, a speedometer and/or a speed indicator widget may display the current speed of the vehicle. A cruise speed of the vehicle may also be displayed. Still further, vehicle pose and vehicle pose status widgets may be provided to indicate pose information for the vehicle. In some embodiments, a thermal camera video feed may be displayed on HUD 216 for the vehicle. For example, the vehicle may be equipped with a thermal camera (e.g., a sensor 224) for night driving. The thermal camera data may be sent to processor 218 for display on HUD 216, which may be on the windshield of the vehicle such that a driver can see the thermal camera imagery and the surroundings simultaneously. It will be appreciated that at least one processor 218 may interface with various sensors located on or associated with the vehicle to display data for the vehicle widgets described herein. Within the vehicle, the user 206 may actuate an input 228 to toggle between screens 302 in a profile. As discussed above, air, space, and waterborne vehicles are also considered within the scope of embodiments herein, and widgets 304 may be provided for displaying relevant information on a display of the air, space, or waterborne vehicle.

As briefly discussed above, sensors 224 may comprise a CBRN (chemical, biological, radiological, and nuclear) sensor. For example, a CBRN sensor may be used to detect radioactivity. As such, it is contemplated that a widget 304 may be configured to display radioactivity data on HUD 216. As another example, a biosensor may interface with a widget 304 to display the presence, identification, concentration, or the like of a detected biohazard, chemical, or other biological substance.

Sensors 224 may also comprise electronic warfare sensors configured to detect electronic activity. For example, an EW sensor may be configured to detect wireless signals and determine the types of signals. For example, the detection of 102.11 type signals may be communicated to the user 206 via an appropriately configured widget 304 to indicate a detected WIFI network. Similarly, signals associated with Internet of Things (IoT) protocols may be detected. The detected signals may be used to determine an identity of the IoT device, a number of users connected to the device, routing information, a device location, and other information that can be written to the HUD 216 by a widget 304. In some embodiments, an acoustic sensor may be configured to detect sound, such as the gunshot fire, and display the detected sound in a widget 304. Generally, a widget 304 may be configured to display data from any sensor 224. Processor 218 may be configured to process the retrieved data for display on the GUI.

Figure 4:
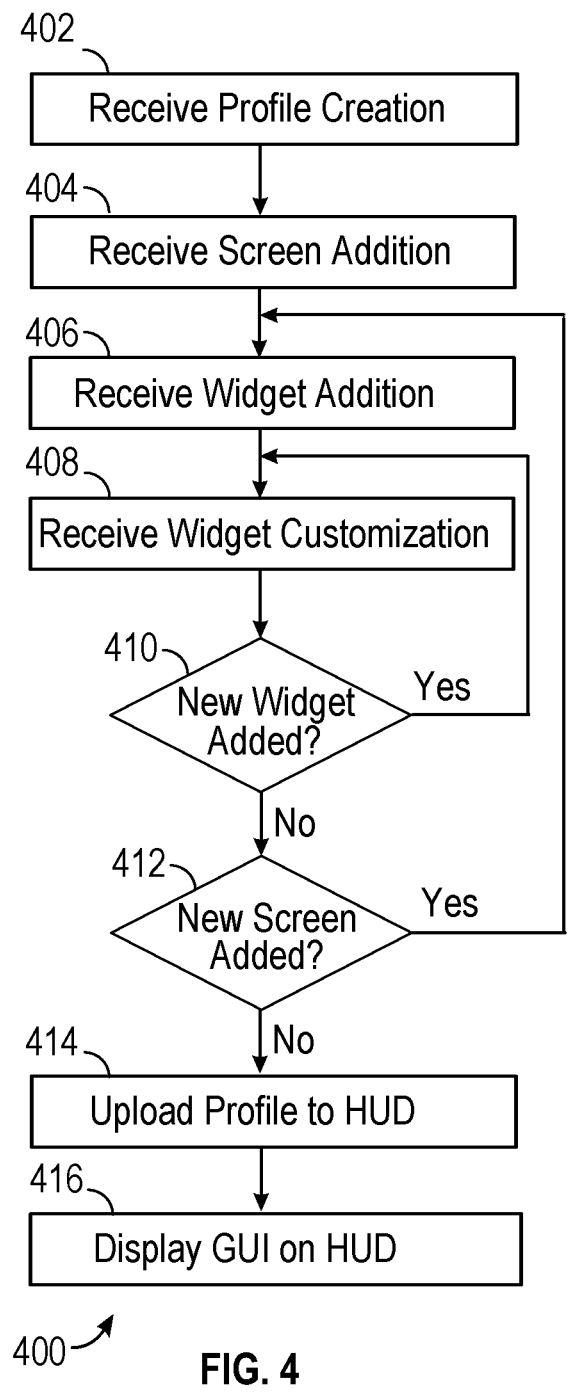
FIG. 4 illustrates an exemplary method for some embodiments.

FIG. 4 illustrates a method 400 for building a profile in accordance with embodiments of the present disclosure. At step 402, user 206 may create the profile via GUI builder 202. As discussed above, profiles are a logical, ordered collection of one or more screens 302, each of the one or more screens comprising one or more widgets 304. Profiles and/or screens 302 may be shared between users 206. Sharing profiles can promote conformity between operators 230 using a HUD 216 and working together on an objective. For example, a mission leader for a military operation can create a customized profile for the mission and share the customized profile with each operative on the mission. Thus, each operative may view the same GUI as other operatives.

Next, at step 404, user input for adding a screen 302 to the profile may be received. In some embodiments, user 206 defines a display order for the screen 302 when adding the screen 302 to the profile. Thereafter, at step 406, user input for adding a widget 304 to the screen 302 may be received. Next, user customization of the widget 304, such as the visual aspects thereof, may be received in GUI builder 202. In some embodiments, user 206 selects one or more sensors 224 from which the widget 304 is configured to display data. For example, if two drones are configured to capture video data of a location that operator 230 will be operating at, user 206 may add a video player widget to a screen 302 and select which drone the video player widget should display data from.

Processing may then proceed to test 410 where it may be determined whether a new widget 304 is added to the screen 302. If a new widget 304 has been added, processing may proceed back to step 408 for customization of the new widget 304 on the screen. If a new widget has not been added, processing may proceed to test 412 where it may be determined whether a new screen 302 has been added to the profile. If a new screen has not been added, processing may proceed back to step 406, and user 206 may add widgets 304 to the new screen 302 and customize the widgets 304 as discussed above. If a screen 302 has not been added and user 206 has completed configuring the profile, processing may proceed to step 414, and the profile may be upload to the HUD 216. Thereafter, at step 416, the HUD 216 may be displayed to operator 230. In some embodiments, HUD 216 is configured to display a screen 302 that has been defined as a home screen. It will be appreciated that after the profile is uploaded and viewed on HUD 216, user 206 may make further modifications to the screens 302 and widgets 304 in the profile, and reupload a modified profile to the HUD 216.

HUD Operation

Figure 5:
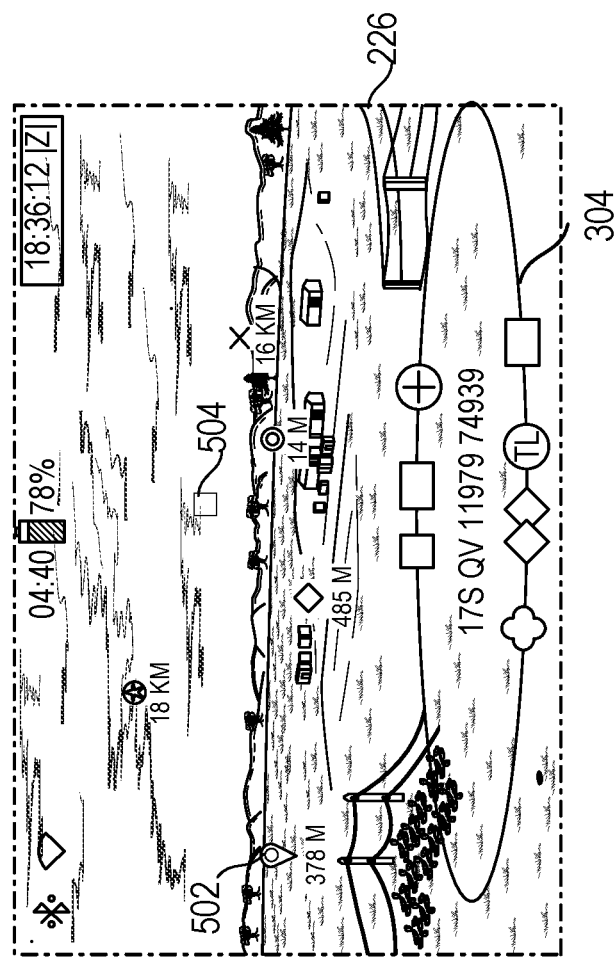
FIG. 5 illustrates an operational embodiment of a GUI created via the GUI builder displayed on the heads-up display for some embodiments.

FIG. 5 illustrates display 226 displaying a screen 302 created by user 206 via GUI builder 202 for some embodiments. As previously mentioned, display 226 may be a see-through display for viewing both the graphical user interface along with the surrounding environment.

In some embodiments, a focus system is provided for interacting with widgets 304 during operation. In some embodiments, operator 230 can toggle focus between widgets 304 on display 226. A widget 304 that has focus may be highlighted or have another visual indicator that the widget 304 is focused. Focus may be transitioned between widgets 304 via an input 228, such as a button press or a voice command. In some embodiments, focus is transitioned in a predefined order (e.g., counterclockwise around display 226). For example, widget focus may move counterclockwise from the situational awareness ring to the clock widget, from the clock widget to the battery widget, from the battery widget to the connection status widget, and from the connection status widget back to situational awareness ring. The predefined order may be configured by user 206 via GUI builder 202.

In some embodiments, widgets 304 are classified as actionable or non-actionable widgets. An actionable widget may be a widget 304 that, when interacted with (e.g., via input 228) causes a preset action(s) to occur. In some embodiments, actionable widgets 304 can be interacted with after receiving focus. For example, a first input 228 (e.g., a short press on a button) may be configured for transitioning focus between widgets 304, and a second input 228 (e.g., a long press on a button) may be configured for interacting with an actionable widget to initiate an action. In some embodiments, voice commands, gestures, or gaze inputs can be used to interact with HUD 216.

As one example of an action that may be performed responsive to an input on an actionable widget, in real time, a checkpoint 502 may be added to a map widget. For example, operator 230 may be wearing HUD 216 and looking at the surrounding environment through the night vision optical device. Cursor element 504 or other user interface input element may be displayed on display 226. With a map widget focused on display 226, operator 230 may actuate input 228 to initiate the action. Upon actuation, the location in the environment over which the cursor element 504 is overlaid may be added as a checkpoint. The checkpoint widget may then be updated with the distance, ETA, and other like parameters to the selected checkpoint. As operator 230 moves through the environment, widgets 304 and checkpoints 502 will update based on the location and pose of operator 230. As another example of an action, an image gallery or video gallery may be a focused widget that, when actioned, causes a camera associated with HUD 216 to take an image or a video. When creating custom widgets 210 via SDK 212, the programmer may specify focus parameters, such as whether a widget is or is not actionable and the action(s) performed in response to an actuation of an actionable widget. Actions and whether widget 304 are actionable may also be configured by user 206 in GUI builder 202.

Operator 230 may also use input 228 to change the screen 302 currently displayed on display 226. For example, a button press may cause display 226 to change display to a new screen 302. In some embodiments, an input 228 (e.g., a voice command) is configured to return the display of HUD 216 to a home screen 302. In some embodiments, operator 230 can move forwards and backwards through the display order of screen 302.

As discussed above, screens 302 may be configured for different aspects of an operation or task. Turning briefly back to FIG. 3B, the various screens 302 in user interface 325 are one example of how GUI builder 202 may be used to create profiles that can be customized to the needs of the operator 230. For example, operator 230 may undertake a hostage rescue mission. The hostage rescue mission may comprise an ingress portion to reach the hostage, a rescue portion to rescue the hostage, and an egress portion. Thus, the profile may be created to have a first screen that displays widgets 304 that are useful for the ingress portion of the mission, such as the checkpoint and distance widget displayed in the top left corner of the currently selected screen. Once the operator 230 reaches the hostage, operator 230 may change the display to view a second screen 302 comprising images of the hostage and the captor. Thus, operator 230 is able to correctly identify friendlies and enemies via HUD 216. Likewise, a third screen may be configured to display translation phrases if a language barrier exists between operator 230 and the hostage. Lastly, a fourth screen 302 can be created for egress.

Figure 6:
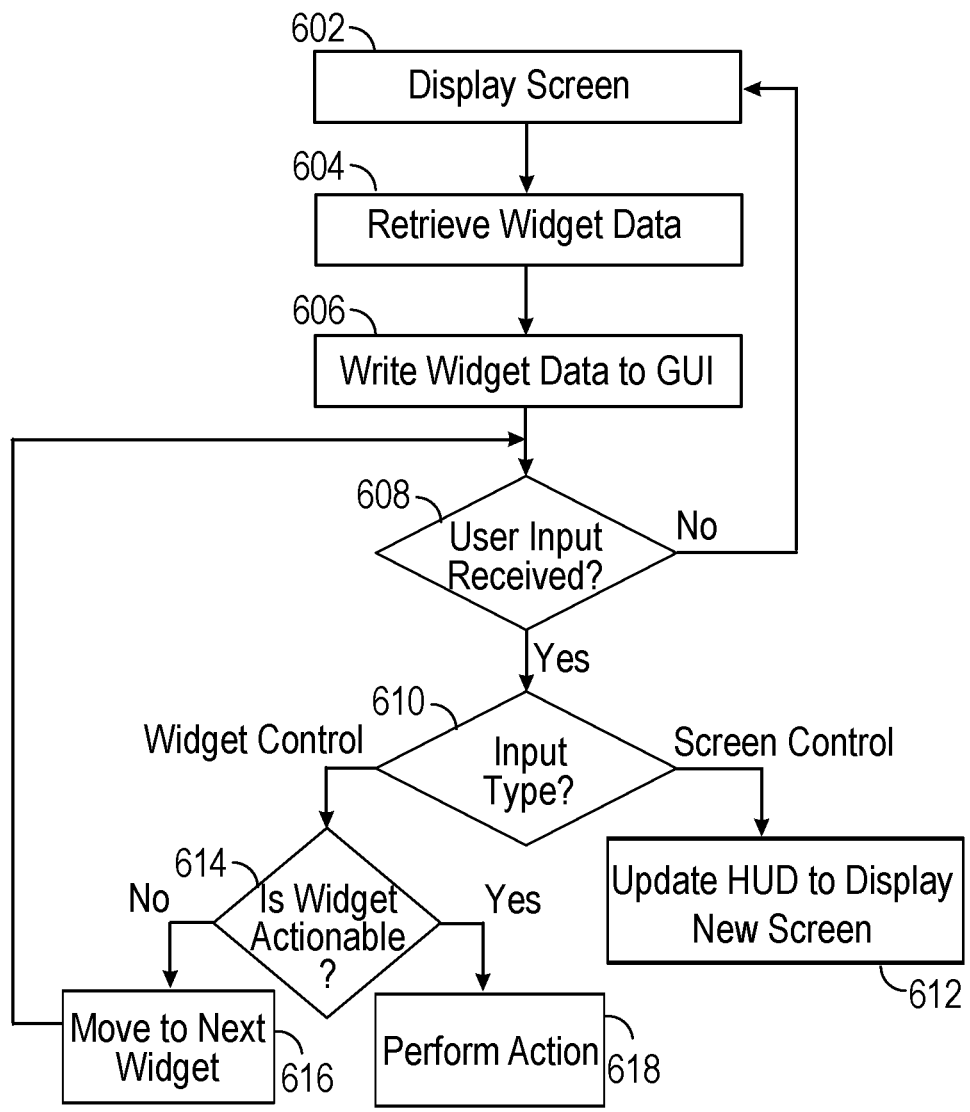
FIG. 6 illustrates an exemplary method for some embodiments.

FIG. 6 illustrates an operational method 600 in accordance with aspects of the present disclosure. At step 602, a screen 302 may be displayed on display 226 of the HUD 216. Display 226 may be a display on a night vision device, in a vehicle, or any other display. In some embodiments, display 226 is a see-through display. Next, at step 604, data for widgets 304 may be retrieved. The data may be retrieved from storage 220, sensors 224, or any data source. Next, at step 606, the data is written to the GUI based on the user configuration of widgets 304. As previously described, user 206 can configure display parameters of widgets 304, such as the position and size on display 226, along with features, such as which sensors 224 the widget 304 is configured to display from. Steps 604 and 606 may happen substantially continuously such that display 226 is updated in real time, in some embodiments.

At test 608, it may be determined whether user input is received. User input may be received via a physical input button, voice commands, gestures, gaze tracking, or the like. In some embodiments, HUD 216 comprises one or more physical inputs for interacting therewith. In some embodiments, the user input comprises one of a widget control input for interacting with widgets 304 or a screen control input for changing the currently-displayed. In some embodiments, distinct physical inputs are provided for receiving widget control input and screen control input. For example, two buttons may be provided for HUD 216; a first button may be configured for inputting widget interaction, and a second button may be configured for changing the displayed screen. As another example, separate voice commands may be configured for widget input control and screen control. If user input is not received, processing may proceed back to step 602, and screen 302 is displayed.

If user input is received, processing may proceed to test 610 where the input type is determined. If the input is for changing the currently displayed screen 302, processing may proceed to step 612, and display 226 may be updated to display a new screen 302. If the input is widget control input for interacting with a widget 304, processing may proceed to test 614.

At test 614, it may be determined whether the widget 304 upon which input was received is actionable. If the widget 304 is not actionable, at step 616, HUD 216 may move focus to the next widget 304, and processing may proceed back to test 608. If the widget 304 is focusable, at step 618, the action associated with the widget 304 may be performed. As described above, gaze tracking, gesture control, voice commands, and the like may be used as inputs for interacting with HUD 216. After the action is performed, focus may be passed to the next widget 304 on screen 302, to the next actionable widget on screen 302, or focus may remain on the current widget. The user may define if/how focus is transitioned after an action is carried out on a per-profile basis, a per-screen basis, a per-widget basis, or any combination thereof.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments, what is claimed as new and desired to be protected by Letters Patent includes the following:

1. One or more non-transitory computer-readable media storing computer-executable instructions that, when executed by at least one processor, perform a method of building a graphical user interface for a heads-up display associated with a first device, the method comprising:
   causing display of, on a second device, a user interface of a graphical user interface builder for the heads-up display;
   receiving, from a user of the second device and in the graphical user interface builder, a first user input for adding a plurality of screens to a profile associated with the user, the profile being an ordered collection of the plurality of screens,
   wherein each of the plurality of screens is configured to display a plurality of widgets within the user interface of the graphical user interface builder;
   receiving a second user input for adding one or more widgets of the plurality of widgets to each screen of the plurality of screens within the user interface,
   wherein the one or more widgets in each screen are associated with one or more data sources, wherein the one or more widgets are configured to display data from the one or more data sources on the heads-up display;
   responsive to receiving, in the graphical user interface builder, a third user input selecting a delete widget control, causing deletion of a first selected widget in each of the plurality of screens having the first selected widget within the user interface;
   responsive to receiving, in the graphical user interface builder, a fourth user input selecting an add widget control for a second selected widget, causing addition of the second selected widget to each of the plurality of screens within the user interface;
   uploading the profile from the second device to the heads-up display; and
   causing display of a screen of the plurality of screens on the heads-up display based on the uploaded profile.

2. The media of claim 1, wherein the second device is a mobile phone.

3. The media of claim 1, further comprising:
   receiving a fifth user input for adding an additional screen to the profile; and
   receiving a sixth user input for adding one or more additional widgets to the additional screen to obtain an updated profile.

4. The media of claim 3, further comprising:
   uploading the updated profile from the second device to the heads-up display; and
   responsive to receiving user input, at the heads-up display and while the screen is displayed, switching the display of the heads-up display from the screen to the additional screen.

5. The media of claim 1, further comprising uploading the profile from the second device to an additional heads-up display associated with a third device.

6. The media of claim 1, further comprising:
   after causing display of the screen on the heads-up display, receiving, via the graphical user interface builder, at least one modification to at least one of: the screen or the one or more widgets to obtain a modified screen;
responsive to receiving the at least one modification, uploading the modified screen from the second device to the heads-up display; and
causing display of the modified screen on the heads-up display.

7. The media of claim 1, wherein the first device is a night vision display device.

8. The media of claim 1, wherein the one or more widgets comprises at least a location widget configured to display a user location of the user.

9. A method for building a graphical user interface with customizable widgets for a heads-up display associated with a first device, the method comprising:
    causing display of, on a second device, a user interface of a graphical user interface builder;
    receiving, from a user of the second device and in the graphical user interface builder for the heads-up display, a first user input for adding a plurality of screens to a profile associated with the user, wherein the profile is an ordered collection of the plurality of screens,
    wherein each screen of the plurality of screens is configured to display a plurality of widgets within the user interface of the graphical user interface builder;
    receiving a second user input for adding two of a particular widget as a first widget and a second widget to one of the plurality of screens within the user interface;
    receiving a third user input for modifying one or more parameters for the second widget,
    wherein the one or more parameters comprises a data source parameter;
    wherein the first widget is configured to display first data from a first data source and the second widget is configured to display second data from a second data source distinct from the first data source based on the data source parameter;
    receiving a fourth user input for adding one or more widgets of the plurality of widgets to each screen of the plurality of screens within the user interface;
    responsive to receiving, in the graphical user interface builder, the fourth user input selecting an add widget control for a third selected widget, causing addition of the third selected widget to each of the plurality of screens within the user interface;
    uploading the profile from the second device to the heads-up display; and
    causing display of a screen of the plurality of screens on the heads-up display based on the uploaded profile, wherein two of the particular widget are displayed on the one of the plurality of screens.

10. The method of claim 9, wherein the heads-up display comprises at least one input element for interacting with the screen on the heads-up display.

11. The method of claim 10, further comprising:
    to receiving an actuation of the at least one input element, causing display of a different screen of the plurality of screens on the heads-up display.

12. The method of The method of claim 10,
    wherein one or more widgets of the plurality of widgets are configured to receive focus on the heads-up display, wherein the method further comprises:
    responsive to receiving a first actuation of the at least one input element while the screen is displayed on the heads-up display, moving the focus between the one or more widgets on the screen.

13. The method of claim 12, wherein the method further comprises:
    responsive to receiving a second actuation of the at least one input element while a widget of the one or more widgets is focused, initiating a predefined action associated with the widget.

* * * * *